United States Patent [19]

Balquet et al.

[11] Patent Number: 4,708,077
[45] Date of Patent: Nov. 24, 1987

[54] HULL SHAPES FOR SURFACE EFFECT SHIP WITH SIDE WALLS AND TWO MODES OF OPERATION

[75] Inventors: Robert Balquet, Paris; Robert Baubeau, Vitry sur Seine; Jean-Paul Bertrand, Paris; Jean-Pierre Guezou, Athis Mons; Philippe Carron, Creteil, all of France

[73] Assignee: L'Etat Francais represente par le Delegue General pour l'Armement, Paris, France

[21] Appl. No.: 849,275

[22] Filed: Apr. 8, 1986

[30] Foreign Application Priority Data

Apr. 29, 1985 [FR] France .............................. 85 05312

[51] Int. Cl.⁴ .............................................. B63B 1/38
[52] U.S. Cl. ..................................... 114/67 A; 114/61; 180/116; 180/126
[58] Field of Search ................. 114/67 A, 56, 61, 283; 180/116, 126, 129, 125

[56] References Cited

U.S. PATENT DOCUMENTS

| | | | |
|---|---|---|---|
| 2,464,957 | 3/1949 | Wood | 114/61 |
| 4,469,334 | 9/1984 | LeComte | 180/116 |
| 4,506,618 | 3/1985 | Chaplin | 180/126 |

FOREIGN PATENT DOCUMENTS 1569807  6/1969  France .
2422535  4/1978  France .

OTHER PUBLICATIONS

Hovermarine Ltd. received in office Jul./Aug. 1968.

Primary Examiner—Joseph F. Peters, Jr.
Assistant Examiner—Edwin L. Swinehart
Attorney, Agent, or Firm—Parkhurst & Oliff

[57] ABSTRACT

The present invention concerns hull shapes for a surface effect ship, including a catamaran type supported structure with two side walls (100) connected by a center platform (200), able to operate either as a buoyant displacement vehicle, or as an air cushion supported vehicle, the side walls (100) confining, with two sealing devices (310, 320), the supporting center air cushion (c). The shape features are as follows: each side keel (100) includes a floor segment (110), an inner wall (120) facing the air cushion (c), and an outer side wall (130); the floor segment is angled upwardly with respect to a horizontal plane, the angle increasing continuously from the after part to the fore part of the keel until forming a deep V at the most fore part; the inner side wall (120) is nearly vertical in the after and fore part and presents a bulge in its upper center part (170); the outer side wall (130) evolves from a concavely curved surface to a planar surface resulting in optimum performance for both modes of operation either as an air cushion vehicle or as a buoyant displacement vehicle.

9 Claims, 6 Drawing Figures

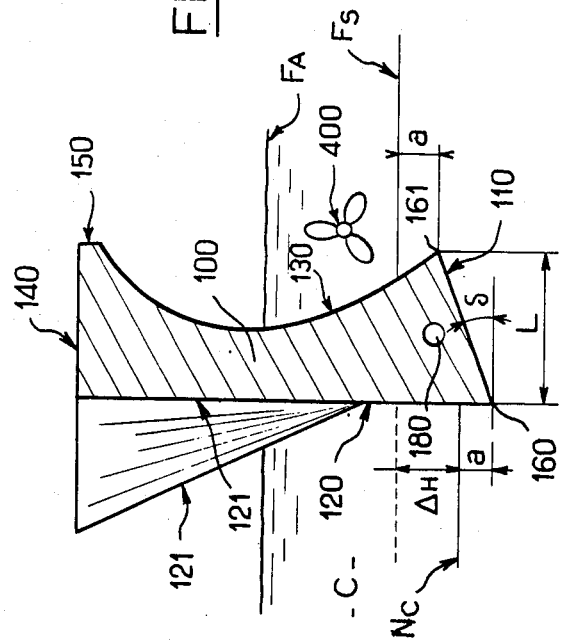
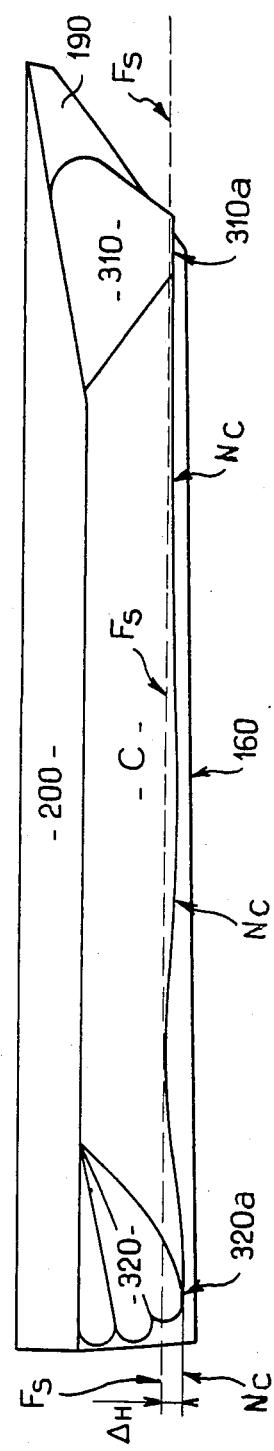
FIG_3
FIG_4

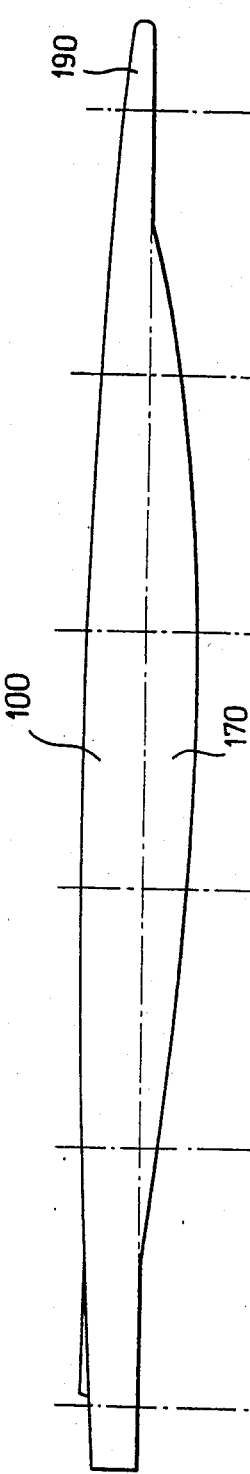
FIG._4b
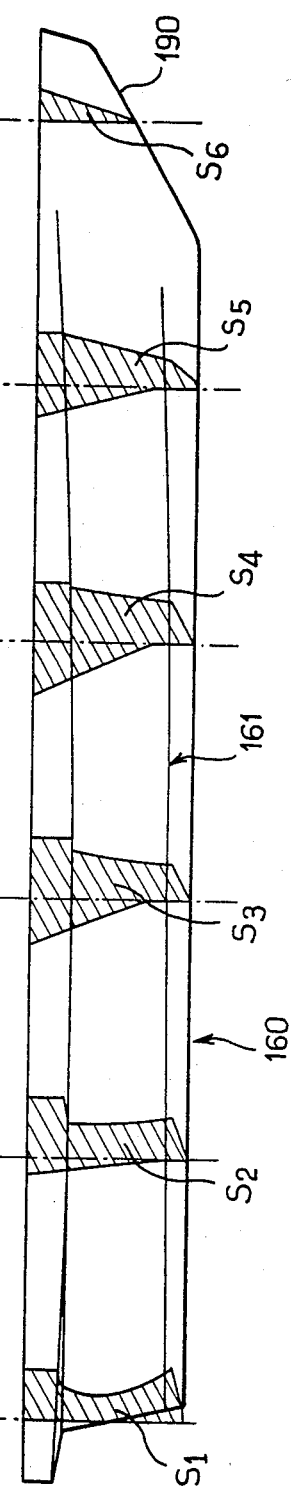
FIG._4a

HULL SHAPES FOR SURFACE EFFECT SHIP WITH SIDE WALLS AND TWO MODES OF OPERATION

BACKGROUND OF THE INVENTION

The present invention concerns improved hull forms for surface effect ships including a center platform with two side walls (keels), able to operate either as a buoyant displacement vehicle or as an air cushion supported vehicle.

Such a ship is supported by an air cushion confined below the center platform by the two side walls (keels) on the one hand and on the other hand at the stern and the bow by two sealing devices. When the cushion is supplied by the pressurized air, the ship is raised to a position where only the lowest part of these two keels is under water, the air escaping from the cushion only through the two sealing devices. In such a supported position, the ship can sail at high speed (fronde number equal or larger than 1) with the help of propelling systems like propellers or hydrojets. When the cushion is no longer supplied, the seals can be listed and the ship floats over its two side walls (keels), as a buoyant displacement ship.

This type of surface effect ship is well known and is described for instance in French Pat. Nos. 2,422,535, 1,569,807 and U.S. Pat. No. 4,272,779.

Generally, the surface effect ships of the previously mentioned type have been designed and built to operate mainly as air cushion supported vehicles; the buoyant mode is only a secondary mode for sailing at low speed.

SUMMARY OF THE INVENTION

The present invention concerns the design of a surface effect ship of the previously mentioned type, with improved hull designs resulting in optimum performance for both modes of operation as an air cushion vehicle or as a buoyant displacement vehicle.

It is also suggested to propel this ship by using hydrojets in the "cushioning" mode, and hydrojets or propellers in buoyant mode. According to the studies and tests carried out by the applicant, the shape itself of the two sidewalls can be optimized for both operation modes.

So this invention relates to hull shapes for a surface effect ship including a catamaran type structure with two side walls, connected by a center platform, able to operate either as a buoyant displacement vehicle or an an air cushion supported vehicle, the side walls (eels) confining, with two sealing devices, the supporting center air cushion (c); each side keel includes a floor segment, an inner side wall facing the cushion (c), and an outer side wall; the floor segment is angled upwardly in a direction away from the air cushion with respect to a horizontal plane the angle increasing from the after part to the fore part of the keel until forming a deep V at the most fore part. The inner side wall is nearly vertical and planar in the after and fore part and presents a bulge in its upper center part. The outer side wall evolves from a concavely curved surface to a planar surface (from a concave curve to a linear curve in transverse cross-section) resulting in optimum performance for both modes of operation either as an air cushion vehicle or an a buoyant displacement vehicle.

In the air cushion supported mode, the above described shapes cooperate efficiently. Indeed, according to a feature of this invention, the intersection of the floor segment with the inner side wall of each keel defines an almost rectilinear keel line. So, the immersion depth of the inner side wall, above this keel line and below the cushion line (NC), always remains at least equal to a minimum value to insure the side tightness of the air cushion. The ship takes a trim angle so that at the design speed the inner side wall immersion depth is about the same from the after part to the fore part of this keel line. Indeed, at such a speed, the wave pattern generated by the air cushion is characterized by a constant slope from the fore body to the after body.

It should be noted that the immersed surface of the keels is reduced in the "cushioning" mode. The immersion depth of the keels on the side of the cushion C is roughly constant and equal to "a", optimizing the side tightness of this cushion. In other words, the cushion air escapes, as previously mentioned, below the lower parts of the sealing devices and not below the keel lines.

In other respects it should be noted that the surface shape defined by the floor segment approximates a hyperbolic paraboloid. So the ship trim is not affected by fluctuations of the dynamic pressure acting on this surface. Indeed it is well known that for such a surface the resultant of forces created by a flow applies to about the same point whatever the incidence is. In other words, the ship trim is not affected by fluctuations of the dynamic pressure acting on the floor surface, assumed to be the geometrical locus of floor segments.

Finally, the position of the point where the side forces resultant applies can be controlled by adjusting suitably the floor segment level.

According to another feature of this invention, the floor segment at the stern of the ship presents an adequate width at the location planned for installing the water intakes of hydrojets.

It should be noted that, in the "cushioning" mode, the vertical immersion depth of the outer side wall at the stern of the ship, above the intersection of the floor segment with the inner wall side and below the waterline (Fs) is approximately equal to the immersion depth "a" of the inner side wall, to prevent any air entrance through the water intakes.

According to another feature of this invention, the fore part of keels are both slender and raised to increase keel penetration into the water.

As for the buoyant mode of operation, the shape selected for the keels is not less efficient. Indeed, the outer side wall widens out toward the top, particularly at the bow and the stern of the ship, to form volumes assuming a righting hydrostatic moment when rolling or pitching. The inner side wall is approximately vertical and planar in the stern and bow of the ship. Between these two ends, the upper part of the inner side wall bulges toward the keel center and defines an innerbulge of the keel. Moreover, these bulged bodies provide, without ballasting, a longitudinal ship centering that is roughly the same for both operation modes, and also an additional hydrostatic righting moment when rolling and pitching as previously mentioned.

According to an interesting feature of this invention, the outer side wall concavity at the stern of the ship allows the mounting of a propeller for the buoyant mode of operation.

All the previously mentioned features of this invention contribute to optimize the seaworthiness of the ship for both modes of operation, and particularly, the buoyant mode can be used normally to extend the range.

Other features and benefits will become evident when reading the following description and referring to the appended figures that show a preferred embodiment of the invention.

BRIEF DESCRIPTION OF THE DRAWINGS

FIG. 3 shows an end view of the after extremity of the right hand keel;

FIG. 4 shows a schematic side view of the shp corresponding to the invention;

FIG. 4a depicts a side view of the right hand keel with various staggered cross sections showing how these sections vary from the stern to the bow of the ship;

FIG. 4b depicts a schematic top view of the left hand keel.

DETAILED DESCRIPTION OF THE PREFERRED EMBODIMENTS

Figure 1:
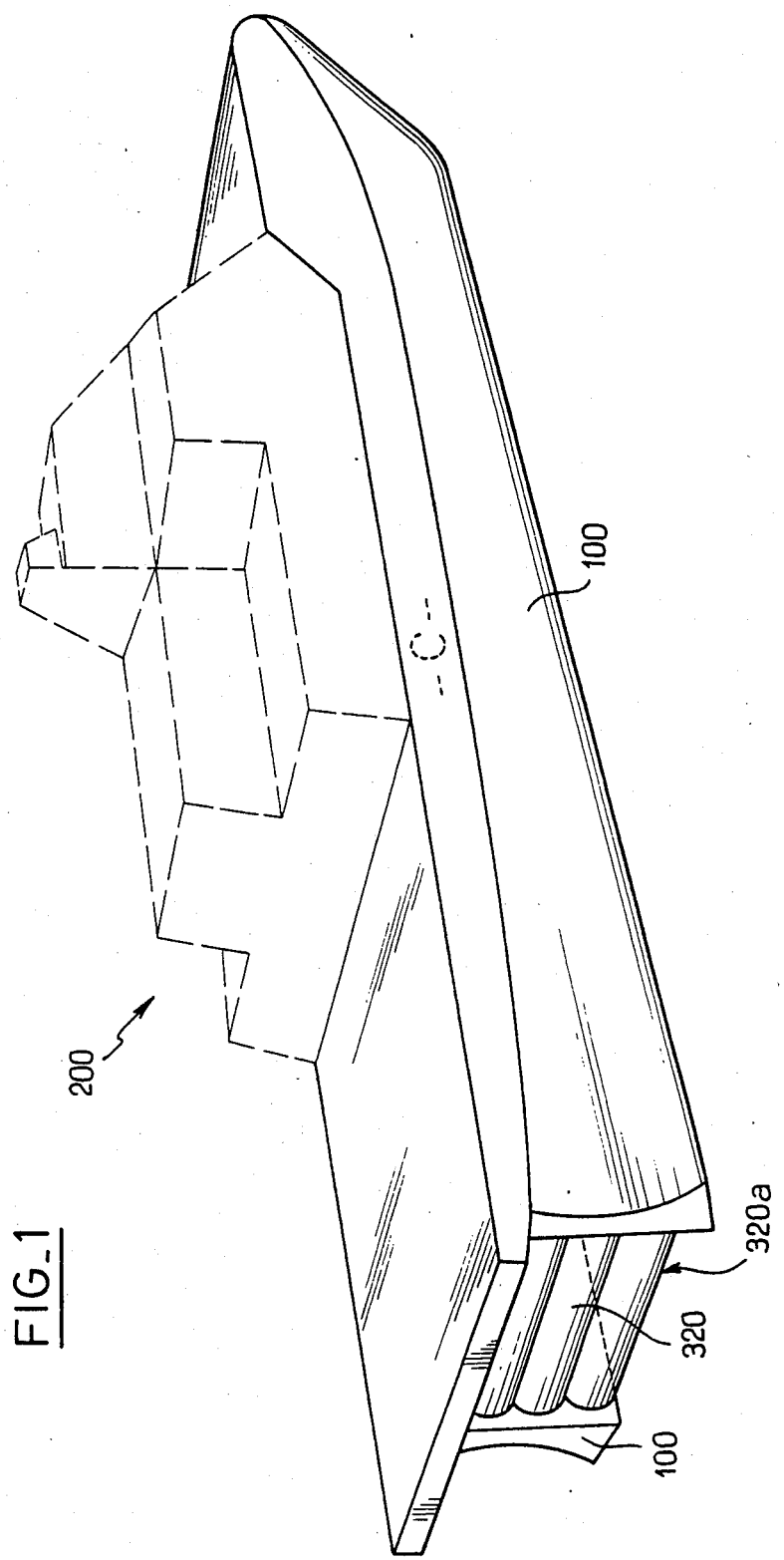
FIG. 1 shows a three quarter rear perspective view of a surface effect ship in accordance with the present invention.

FIG. 1 shows the general layout of the ship corresponding to the invention. Basically the ship includes two side keels or hulls (100) connected by a center structure (200).

The center structure (200) is preferably shaped as a center box with each side keel (100) built in. Suitable center structures for practicing the present invention are well known in the art.

In a conventional way, both keels (100) assist two bow and stern sealing devices (310, 320) (Ref. FIG. 4) for delimiting, between the keels (100) and below the structure (200), a center volume (c) forming the supporting air cushion supplied by a pressurized air generator; the air can escape below the sealing devices in the areas 310a, 320a.

The sealing devices (310, 320) can be raised, and consequently the ship corresponding to the invention can operate either as an air cushion or as a buoyant displacement vehicle over its two keels (100). Seal lifting devices suitable in the practice of the present invention are well known in the art.

As explained, this invention aims to optimize the side keels (100) shape for obtaining optimum performance in the "cushioning" mode as well as in the buoyant mode of operation.

Both keels (100) are located at the right hand and left hand of the ship, symetrically with respect to the ship body sheer plan. The same references designate the various symetrical elements of both keels.

Generally each keel (100) includes mainly a floor or bottom segment (110), an inner side wall (120), an outer side wall (130), and a horizontal upper segment (140). In the representative example, a vertical flange (150) connects the segment (140) to the outer side wall (130).

The typical features of this design are the progressive profile of the floor segment (110) and the progressive shape of the inner and outer side walls (120, 130).

Figure 2:
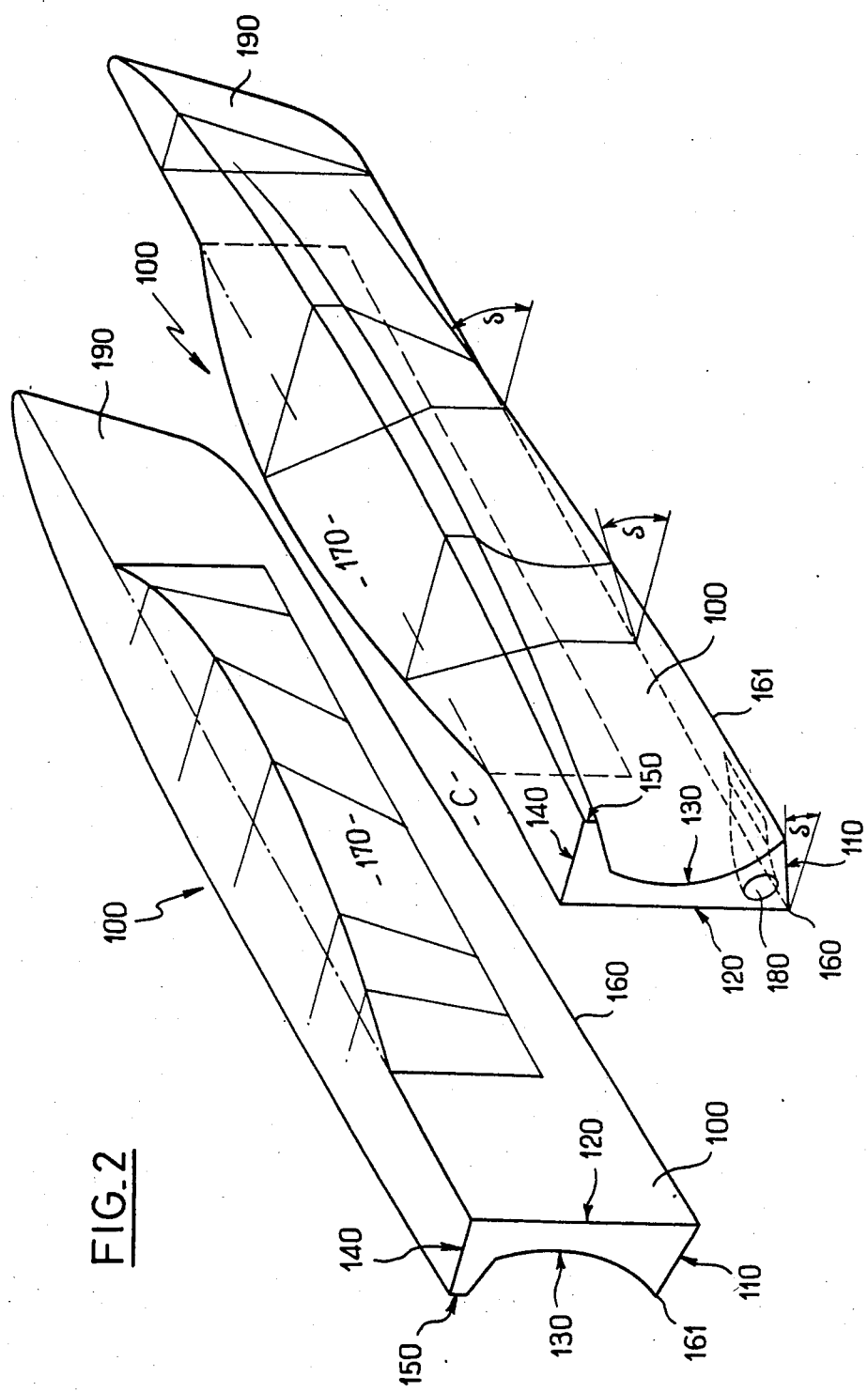
FIG. 2 shows a similar perspective view of the two side walls (keels) of this ship opposite each other; all the other parts of this ship not shown.

As illustrated particularly in FIGS. 2, 3 and 4a, the floor segment (110) is rectilinear and sloping at a variable angle δ, initially about 20 degrees at the stern of the ship and increasing progressively until about 60 degrees at the bow where the keel becomes slender. The FIG. 4a illustrates particularly this variation, as it shows six keel cross sections references S1 to S6 from the stern to the bow; the cross section S1 is also depicted in the rear view of the FIG. 3.

With such a variation, this floor segment (110) defines from the stern to the bow a hyperbolic paraboloid.

The intersection of the floor segment (110) with the inner side wall (120) defines the keel line (160). This keel line is roughly rectilinear and horizontal in buoyant mode of operation, but it is slightly sloping in "cushioning" mode. The intersection of the floor segment (110) with the outer side wall (130) defines a roughly rectilinear line (161) that rises slightly from the stern to the bow with respect to the keel line (160).

The keels (100) are provided with bulges (170) at the upper part of the inner side wall (120) thereof formed by hull skins (121). Bulges (170) provide the ship with lift in the buoyant mode of operation without sinking the ship too much with respect to the water level. In other words, these bodies allow a decrease in the vertical distance between the waterline in the buoyant mode (FA) and the waterline in "cushioning" mode (FS). Such a feature limits the impact of waves on the hull girder.

Finally, the bullgleld bodies allow space savings for the keel outfits.

The above hull shapes being correctly defined, the following functional elements are described in order to fully understand the invention.

As particularly illustrated in FIG. 3, the waterline in the buoyant mode of operation (FA) is located approximately half-way up the keel (100). In the "cushioning" mode of operation, the center air cushion (c) raises the ship and its keels, and so the waterline for the "cushioning" mode (FS) is reached, whilst, from the side of inner profile (120), the cushion (c) pushes back water to a level NC indicated on the FIGS. 3 and 4.

So, the selected shapes for both keels (100) optimize the seaworthiness, of the ship for each mode of operation, as it will be explained.

In the "cushioning" mode, the hulls (100) are submerged very little. As indicated by FIG. 3, the immersion depth at the after part of keels is roughly the same, i.e., "a", for the innerside wall with respect to the cushion line (NC) and for the outer side wall with respect to the water line (FS). The horizontal breadth of the floor segment (110) is relatively large, as illustrated, at the stern of the ship and it is decreasing from the stern to the bow. As it is illustrated in detail in FIG. 4, the cushion line (NC) stays approximately parallel to the keel line (160). That means that the immersion depth of the inner side wall (120) below the cushion (c) remains roughly constant from the stern to the bow of the ship, with a value preferably lower than "a".

Such keel shapes and such immersion conditions for the "cushioning" mode of operation provide unquestionable benefits.

First, in the most submerged part, in the after section of the keels, below the waterline (FS) one can install water jet propelling systems with a short propulsion circuit or hydrojet, designated by (180) on FIGS. 2 and 3. The water intakes supplying these hydrojets are located below the waterline surface (FS).

As previously indicated, the bow and stern seals (310, 320) confining the supporting air cushion are located in the areas where the keels (100) have a roughly vertical inner side wall. This layout allows moving vertically the seals without difficulty and helps to switch from the "cushioning" mode with the seals spread out to the buoyant mode with the seals raised.

The outer side wall (130) varies from the stern to the bow, from a concave curve forming a cut-out part as illustrated on FIG. 2 until a full body as shown on the sections S4 and S5.

At the stern of the ship, the outer side wall (130) of each keel (100) has a cut-out (130) where is accomodated the propeller (400) below the waterline in buoyant mode (Fa).

Although this feature does not relate to the present invention, it is recommended to use a propeller that can be raised. Such propeller raising apparatus are well known in the art.

The variation of the keel shape from the stern to the bow provides a better tradeoff resulting in high performance in buoyant mode and in the "cushioning" mode. As an example, for such a ship with 80 meters length, a 50 knots speed is reached in "cushioning mode" with hydrojet propulsion and a 20 knots speed is reached in buoyant mode with propeller propulsion.

We claim:

1. A ship hull for a surface effect ship including a catamaran type supported structure with a center structure able to operate either a a buoyant displacement vehicle or as an air cushion supported vehicle, said hull comprising:

two keels connected by said center platform, said keels confining with two sealing devices the supporting air cushion, each keel including a floor segment, an inner side wall facing the cushion, and an outer side wall, wherein:

the floor segment is angled upwardly in a direction away from said air cushion with respect to a horizontal plane defining an angle therebetween, said angle increasing continuously from an aft end to a fore end of said each keel, said each keel forming a deep V-shape at the fore end;

said inner side-wall is substantially vertical and planar proximate the fore and aft ends of said each keel and includes an arcuate inwardly directed bulged portion at an upper central portion of said inner side wall;

the outer side wall has a transverse cross-sectional shape which changes continuously along the length of said each keel from a curve concave outwardly from said air cushion at the aft end to a substantially linear shape proximate the fore end.

2. A ship hull as set forth in the claim 1, wherein the intersection of the floor segment with the inner side wall of each keel defines a substantially rectilinear keel line and in the cushioning mode of operation, the immersion depth of the inner side wall does not fall below a minimum value, insuring the side tightness of the air cushion.

3. A ship hull as set forth in the claim 1, wherein the floor segment at the stern of the ship ha a breadth sufficient to allow the installation of hydrojet water intakes.

4. A ship hull as set forth in claim 3, wherein the floor segment and the outer sidewall intersect along a substantially rectilinear line and at the stern of the ship, the vertical immersion depth of the outer side wall is approximately rectilinear and equal to the immersion depth of the inner side wall, to prevent air from entering through the water intakes.

5. A ship hull as set forth in claim 1, wherein in the buoyant mode of operation, at least one propeller is associated with each hull located within an after cut-out defined by the concavity of the outer side wall below the waterline in the buoyant mode.

6. A ship hull as set forth in claim 1, wherein the floor segment defines from the stern to the bow a surface corresponding to a hyperbolic paraboloid.

7. A ship hull according to claim 1, further comprising raisable seals at the bow and the stern of the ship oriented at right angles with the substantially vertical inner side wall of each keel.

8. A ship hull, as set forth in claim 1, wherein a fore lower part of each keel is slender and converges to a water cutting edge.

9. A surface effect ship as set forth in claim 1, wherein the ship hull centering in the buoyant mode of operation is provided by the cooperation of the volume delimited by the hull bulges generating buoyancy lift, of the limited after volume of the keels, and of an increased fore volume in an upper part of the keels.

* * * * *